United States Patent
Mizuno et al.

(10) Patent No.: US 10,974,747 B2
(45) Date of Patent: Apr. 13, 2021

(54) ON-BOARD SYSTEM AND TRAIN OCCUPANCY RANGE CALCULATION METHOD

(71) Applicant: KYOSAN ELECTRIC MFG. CO., LTD., Yokohama (JP)

(72) Inventors: Kenji Mizuno, Sagamihara (JP); Tamotsu Yokoyama, Yokohama (JP); Tomonori Itagaki, Kawasaki (JP); Toshifumi Nishi, Yokohama (JP)

(73) Assignee: KYOSAN ELECTRIC MFG. CO., LTD., Yokohama (JP)

( * ) Notice: Subject to any disclaimer, the term of this patent is extended or adjusted under 35 U.S.C. 154(b) by 360 days.

(21) Appl. No.: 16/185,072

(22) Filed: Nov. 9, 2018

(65) Prior Publication Data
US 2019/0077431 A1  Mar. 14, 2019

Related U.S. Application Data

(63) Continuation of application No. PCT/JP2016/064109, filed on May 12, 2016.

(51) Int. Cl.
| | |
|---|---|
| *B61L 27/00* | (2006.01) |
| *B61L 25/02* | (2006.01) |
| *B60L 15/40* | (2006.01) |
| *B60L 3/00* | (2019.01) |
| *B60L 3/10* | (2006.01) |
| *B61L 15/00* | (2006.01) |
| *B61L 3/00* | (2006.01) |
| *B61L 3/12* | (2006.01) |

(52) U.S. Cl.
CPC ......... *B61L 27/0027* (2013.01); *B60L 3/0015* (2013.01); *B60L 3/0038* (2013.01);
(Continued)

(58) Field of Classification Search
CPC .... B60L 3/0015; B60L 3/0038; B60L 3/0076; B60L 3/10; B60L 15/40; B61L 3/008; B61L 15/0072; B61L 25/025
(Continued)

(56) References Cited

U.S. PATENT DOCUMENTS

| | | | |
|---|---|---|---|
| 6,311,109 B1 * | 10/2001 | Hawthorne | ............. B61L 3/002 246/122 R |
| 2005/0133673 A1 * | 6/2005 | Sugita | ................. B61L 27/0038 246/167 R |

(Continued)

FOREIGN PATENT DOCUMENTS

| | | |
|---|---|---|
| EP | 2614983 A2 | 7/2013 |
| JP | 7-151774 A | 6/1995 |

(Continued)

*Primary Examiner* — Peter D Nolan
*Assistant Examiner* — Luke Huynh
(74) *Attorney, Agent, or Firm* — Muncy, Geissler, Olds & Lowe, P.C.

(57) ABSTRACT

Whether or not slip-or-skid of a wheel on any one of a plurality of axles of a train to which pulse generators (PGs) are provided has occurred is determined on the basis of speed pulses output from the PGs. When occurrence of slip-or-skid is detected, a train occupancy range is calculated with a front end portion of the train determined on the basis of a forward-side one of train positions obtained on the basis of the speed pulses output by the PGs, and with a rear end portion of the train determined on the basis of a backward-side one of the train positions. Whether or not any of the PGs is abnormal is determined on the basis of the speed pulses or a speed and acceleration/deceleration calculated from the speed pulses.

12 Claims, 12 Drawing Sheets

(52) U.S. Cl.
CPC .............. B60L 3/0076 (2013.01); B60L 3/10 (2013.01); B60L 15/40 (2013.01); B61L 3/008 (2013.01); B61L 15/0072 (2013.01); B61L 25/025 (2013.01); B60L 2200/26 (2013.01); B60L 2240/62 (2013.01); B61L 3/125 (2013.01)

(58) Field of Classification Search
USPC ........................................................ 701/19
See application file for complete search history.

(56) References Cited

U.S. PATENT DOCUMENTS

| | | | | |
|---|---|---|---|---|
| 2009/0105893 | A1* | 4/2009 | Kernwein | ............. B61L 25/025 701/19 |
| 2009/0230254 | A1* | 9/2009 | Daum | .................... B61L 3/125 246/27 |
| 2014/0012439 | A1* | 1/2014 | Dimmer | ................ B61L 25/025 701/19 |
| 2014/0117169 | A1* | 5/2014 | Itagaki | ..................... B61L 1/10 246/34 R |
| 2019/0077427 | A1 | 3/2019 | Itagaki et al. | |

FOREIGN PATENT DOCUMENTS

| | | |
|---|---|---|
| JP | 2004-173399 A | 6/2004 |
| JP | 2005-12853 A | 1/2005 |
| JP | 2006-300699 A | 11/2006 |
| JP | 2013-5588 A | 1/2013 |
| JP | 2013-141891 A | 7/2013 |
| JP | 5680762 B2 | 3/2015 |
| JP | 2015-189361 A | 11/2015 |
| WO | 2014064826 A1 | 5/2014 |

* cited by examiner

[POWER RUNNING: SLIP]

[BRAKING: SKID]

100
ON-BOARD SYSTEM AND TRAIN OCCUPANCY RANGE CALCULATION METHOD

CROSS REFERENCE TO RELATED APPLICATION

This application is a continuation of International Patent Application No. PCT/JP2016/064109, having an international filing date of May 12, 2016 which designated the United States, the entirety of which is incorporated herein by reference.

BACKGROUND

Development of wireless train control systems using wireless communications for ground-on-board communications has progressed. In the wireless train control systems, a ground side is notified of a position of the train calculated by an on-board system, so that a cost for ground-side equipment can be reduced. The on-board system calculates the position of the train on the basis of a rotation detection signal, corresponding to rotation of an axle, output by a rotation detector including a tacho-generator (TG) and a pulse generator (PG) provided to the axle.

When the rotation detector fails, the rotation detection signal is not output, and thus the train position cannot be calculated. Even when the rotation detector is not under failure, the train position cannot be completely free of errors due to wearing or slip-or-skid of wheels. The slip-or-skid randomly occurs and results in a large error in the train position. JP-A-2004-173399 discloses a technique of counting the pulse count of a speed generator to detect the slip-or-skid.

The train control is performed with the train occupancy range for the position of each train. The train occupancy range is a range on the track that is likely to include the train used. Specifically, the train occupancy range is obtained with margin distances on the forward and the backward side of the train added, and thus is a range longer than the actual train length, by taking account of an error in the train position by the on-board system. The train control is performed on the basis of the train position of each train. Thus a train position error might lead to incidents such as a train crash, and thus is extremely dangerous. In view of this, it is important to calculate a train position accurately and also to calculate the train occupancy range with the margin distances appropriately set. A longer margin distance can achieve a lower risk but leads to a train occupancy range extending to an area that is extremely unlikely to include the train, and thus results in an excessively long train interval.

SUMMARY

According to one aspect of the invention, there is provided an on-board system calculating a train occupancy range in which a train may exist, wherein the train is provided with rotation detectors that are each provided to a corresponding one of a plurality of axles of the train and each output a rotation detection signal corresponding to rotation of the axle, the on-board system performing:

calculating train positions of the train for each of the rotation detectors on the basis of the rotation detection signal from corresponding the rotation detector;

detecting an occurrence of slip-or-skid of a wheel for any one of the plurality of axles, by using the rotation detection signals from the rotation detectors;

setting, when the occurrence of the slip-or-skid is not detected, a no-slip-or-skid state range that is a train occupancy range including a range of a train length of the train based on any of train positions obtained for each of the rotation detectors, a range of a forward margin distance of the train, and a range of a backward margin distance of the train; and setting, when the occurrence of the slip-or-skid is detected, the train occupancy range to be a range that includes a range of the train length based on a forward-most one of the train positions obtained for each of the rotation detectors, the range of the forward margin distance, and a range obtained by expanding the range of the backward margin distance backward by a distance equal to or larger than a difference between the train positions obtained for each of the rotation detectors, to be a range that includes the no-slip-or-skid state range and is wider than the no-slip-or-skid state range.

According to the second aspect of the invention, there is provide an on-board system calculating a train occupancy range in which a train may exist, wherein the train is provided with rotation detectors that are each provided to a corresponding one of a plurality of axles of the train and each output a rotation detection signal corresponding to rotation of the axle, the on-board system performing:

calculating train positions of the train for each of the rotation detectors on the basis of the rotation detection signal from corresponding the rotation detector;

detecting an occurrence of slip of a wheel and an occurrence of skid of a wheel for the plurality of axles, by using the rotation detection signals from the rotation detectors;

setting, when the occurrence of any one of the slip and skid is not detected, a no-slip-or-skid state range that is the train occupancy range including a range of a train length of the train based on any one of the train positions obtained for each of the rotation detectors, a range of a forward margin distance of the train, and a range of a backward margin distance of the train;

setting, when the occurrence of the slip is detected, the train occupancy range to be a range including a range of the train length based on a backward-most one of the train positions obtained for each of the rotation detectors, a range obtained by expanding forward the range of the forward margin distance, and the range of the backward margin distance, to be a range that includes the no-slip-or-skid state range and is wider than the no-slip-or-skid state range; and setting, when the occurrence of the skid is detected, the train occupancy range to be a range including a range of the train length based on a forward-most one of the train positions obtained for each of the rotation detectors, the range of the forward margin distance, and a range obtained by expanding backward the range of the backward margin distance, to be a range that includes the no-slip-or-skid state range and is wider than the no-slip-or-skid state range.

According to the third aspect of the invention, there is provided a train occupancy range calculation method of calculating, by an on-board system mounted on a train, a train occupancy range in which the train may exist, the train being provided with rotation detectors that are each provided to a corresponding one of a plurality of axles of the train and each output a rotation detection signal corresponding to rotation of the axle, the method comprising:

calculating train positions of the train for each of the rotation detectors on the basis of the rotation detection signal from corresponding the rotation detector;

detecting an occurrence of slip-or-skid of a wheel for any one of the plurality of axles, by using the rotation detection signals from the rotation detectors;

setting, when the occurrence of the slip-or-skid is not detected, a no-slip-or-skid state range that is a train occupancy range including a range of a train length of the train based on any of train positions obtained for each of the rotation detectors, a range of a forward margin distance of the train, and a range of a backward margin distance of the train; and setting, when the occurrence of the slip-or-skid is detected, the train occupancy range to be a range that includes a range of the train length based on a forward-most one of the train positions obtained for each of the rotation detectors, the range of the forward margin distance, and a range obtained by expanding the range of the backward margin distance backward by a distance equal to or larger than a difference between the train positions obtained for each of the rotation detectors, to be a range that includes the no-slip-or-skid state range and is wider than the no-slip-or-skid state range.

According to the fourth aspect of the invention, there is provided a train occupancy range calculation method of calculating, by an on-board system mounted on a train, a train occupancy range in which a train may exist, the train being provided with rotation detectors that are each provided to a corresponding one of a plurality of axles of the train and each output a rotation detection signal corresponding to rotation of the axle, the method comprising:

calculating train positions of the train for each of the rotation detectors on the basis of the rotation detection signal from corresponding the rotation detector;

detecting an occurrence of slip of a wheel and an occurrence of skid of a wheel for the plurality of axles, by using the rotation detection signals from the rotation detectors;

setting, when the occurrence of any one of the slip and skid is not detected, no-slip-or-skid state range that is the train occupancy range including a range of a train length of the train based on any one of the train positions obtained for each of the rotation detectors, a range of a forward margin distance of the train, and a range of a backward margin distance of the train;

setting, when the occurrence of the slip is detected, the train occupancy range to be a range including a range of the train length based on a backward-most one of the train positions obtained for each of the rotation detectors, a range obtained by expanding forward the range of the forward margin distance, and the range of the backward margin distance, to be a range that includes the no-slip-or-skid state range and is wider than the no-slip-or-skid state range; and setting, when the occurrence of the skid is detected, the train occupancy range to be a range including a range of the train length based on a forward-most one of the train positions obtained for each of the rotation detectors, the range of the forward margin distance, and a range obtained by expanding backward the range of the backward margin distance, to be a range that includes the no-slip-or-skid state range and is wider than the no-slip-or-skid state range.

DESCRIPTION OF EXEMPLARY EMBODIMENTS

Figure 1:
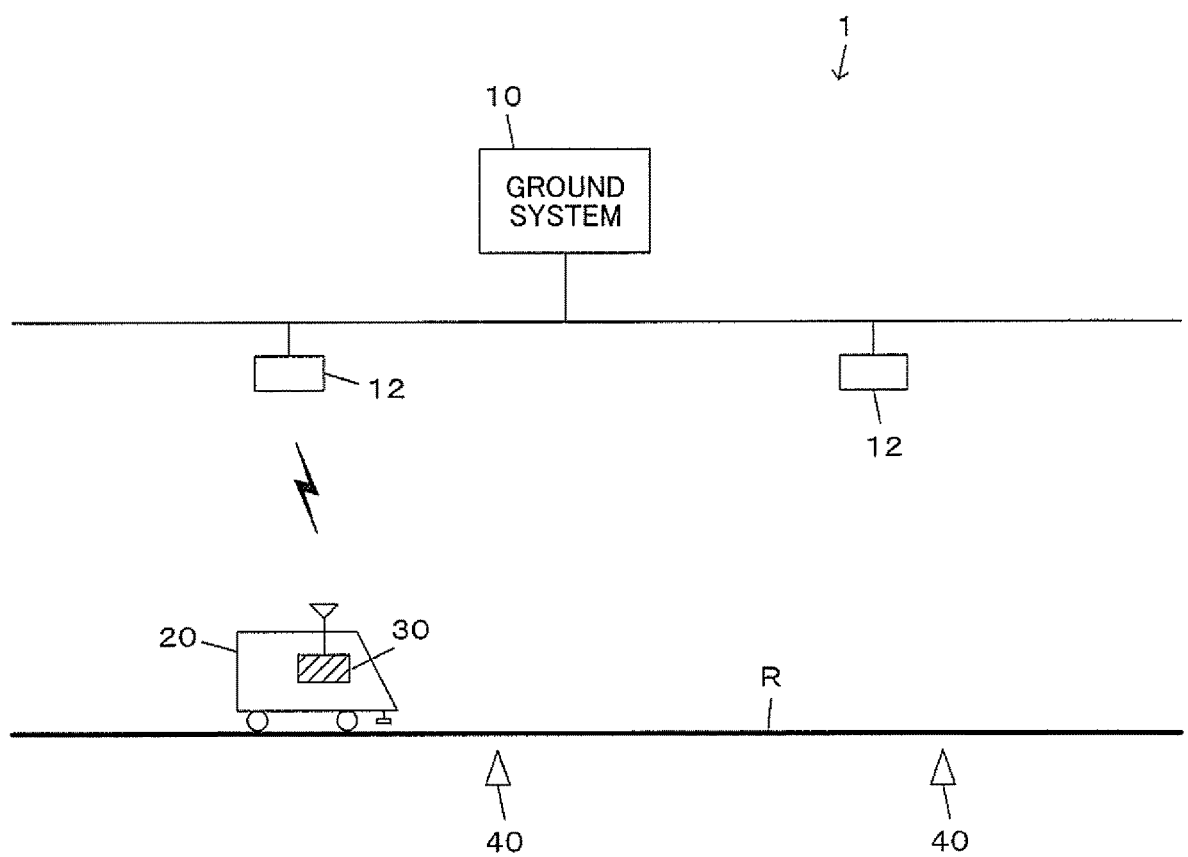
FIG. 1 is a diagram illustrating the configuration of a train control system.

The embodiment of the present invention is to enable a train occupancy range to have a range length appropriately calculated on the basis of a train position calculated on the basis of a rotation detection signal from a rotation detector provided to an axle. The another embodiment of the present invention is to enable a failure of the rotation detector to be determined.

According to one embodiment of the present invention, there is provided an on-board system calculating a train occupancy range in which a train may exist, wherein the train is provided with rotation detectors that are each provided to a corresponding one of a plurality of axles of the train and each output a rotation detection signal corresponding to rotation of the axle, the on-board system performing:

calculating train positions of the train for each of the rotation detectors on the basis of the rotation detection signal from corresponding the rotation detector;

detecting an occurrence of slip-or-skid of a wheel for any one of the plurality of axles, by using the rotation detection signals from the rotation detectors;

setting, when the occurrence of the slip-or-skid is not detected, a no-slip-or-skid state range that is a train occupancy range including a range of a train length of the train based on any of train positions obtained for each of the rotation detectors, a range of a forward margin distance of the train, and a range of a backward margin distance of the train; and setting, when the occurrence of the slip-or-skid is detected, the train occupancy range to be a range that includes a range of the train length based on a forward-most one of the train positions obtained for each of the rotation detectors, the range of the forward margin distance, and a range obtained by expanding the range of the backward margin distance backward by a distance equal to or larger than a difference between the train positions obtained for each of the rotation detectors, to be a range that includes the no-slip-or-skid state range and is wider than the no-slip-or-skid state range.

According to another embodiment of the invention, there is provided a train occupancy range calculation method of calculating, by an on-board system mounted on a train, a train occupancy range in which the train may exist, the train being provided with rotation detectors that are each provided to a corresponding one of a plurality of axles of the train and each output a rotation detection signal corresponding to rotation of the axle, the method comprising:

calculating train positions of the train for each of the rotation detectors on the basis of the rotation detection signal from corresponding the rotation detector;

detecting an occurrence of slip-or-skid of a wheel for any one of the plurality of axles, by using the rotation detection signals from the rotation detectors;

setting, when the occurrence of the slip-or-skid is not detected, a no-slip-or-skid state range that is a train occupancy range including a range of a train length of the train based on any of train positions obtained for each of the rotation detectors, a range of a forward margin distance of the train, and a range of a backward margin distance of the train; and setting, when the occurrence of the slip-or-skid is detected, the train occupancy range to be a range that includes a range of the train length based on a forward-most one of the train positions obtained for each of the rotation detectors, the range of the forward margin distance, and a range obtained by expanding the range of the backward margin distance backward by a distance equal to or larger than a difference between the train positions obtained for each of the rotation detectors, to be a range that includes the no-slip-or-skid state range and is wider than the no-slip-or-skid state range.

With this embodiment of the present invention, the train occupancy range based on the train position can be set as the range that includes the no-slip-or-skid state range (the train occupancy range in a case where the occurrence of the slip-or-skid is not detected) and is wider than the no-slip-or-skid state range, when the occurrence of the slip-or-skid is detected for any one of the plurality of axles each provided with the rotation detector. This configuration can ensure safety regarding the train occupancy range, considering the fact that when slip-or-skid occurs, the error in the train position based on the detection signal from the rotation detector increases.

With this embodiment of the present invention, when the occurrence of the slip-or-skid is detected, the train occupancy range is set to be a range wider than the no-slip-or-skid state range by expanding the backward margin distance. Thus, when the slip-or-skid occurs, the train occupancy range can be appropriately set to be a range ensuring safety.

According to another embodiment of the invention, there is provided an on-board system calculating a train occupancy range in which a train may exist, wherein the train is provided with rotation detectors that are each provided to a corresponding one of a plurality of axles of the train and each output a rotation detection signal corresponding to rotation of the axle, the on-board system performing:

calculating train positions of the train for each of the rotation detectors on the basis of the rotation detection signal from corresponding the rotation detector;

detecting an occurrence of slip of a wheel and an occurrence of skid of a wheel for the plurality of axles, by using the rotation detection signals from the rotation detectors;

setting, when the occurrence of any one of the slip and skid is not detected, a no-slip-or-skid state range that is the train occupancy range including a range of a train length of the train based on any one of the train positions obtained for each of the rotation detectors, a range of a forward margin distance of the train, and a range of a backward margin distance of the train;

setting, when the occurrence of the slip is detected, the train occupancy range to be a range including a range of the train length based on a backward-most one of the train positions obtained for each of the rotation detectors, a range obtained by expanding forward the range of the forward margin distance, and the range of the backward margin distance, to be a range that includes the no-slip-or-skid state range and is wider than the no-slip-or-skid state range; and setting, when the occurrence of the skid is detected, the train occupancy range to be a range including a range of the train length based on a forward-most one of the train positions obtained for each of the rotation detectors, the range of the forward margin distance, and a range obtained by expanding backward the range of the backward margin distance, to be a range that includes the no-slip-or-skid state range and is wider than the no-slip-or-skid state range.

According to another embodiment of the invention, there is provided a train occupancy range calculation method of calculating, by an on-board system mounted on a train, a train occupancy range in which a train may exist, the train being provided with rotation detectors that are each provided to a corresponding one of a plurality of axles of the train and each output a rotation detection signal corresponding to rotation of the axle, the method comprising:

calculating train positions of the train for each of the rotation detectors on the basis of the rotation detection signal from corresponding the rotation detector;

detecting an occurrence of slip of a wheel and an occurrence of skid of a wheel for the plurality of axles, by using the rotation detection signals from the rotation detectors;

setting, when the occurrence of any one of the slip and skid is not detected, no-slip-or-skid state range that is the train occupancy range including a range of a train length of the train based on any one of the train positions obtained for each of the rotation detectors, a range of a forward margin distance of the train, and a range of a backward margin distance of the train;

setting, when the occurrence of the slip is detected, the train occupancy range to be a range including a range of the train length based on a backward-most one of the train positions obtained for each of the rotation detectors, a range obtained by expanding forward the range of the forward margin distance, and the range of the backward margin distance, to be a range that includes the no-slip-or-skid state range and is wider than the no-slip-or-skid state range; and setting, when the occurrence of the skid is detected, the train occupancy range to be a range including a range of the train length based on a forward-most one of the train positions obtained for each of the rotation detectors, the range of the forward margin distance, and a range obtained by expanding backward the range of the backward margin distance, to be a range that includes the no-slip-or-skid state range and is wider than the no-slip-or-skid state range.

With this embodiment of the present invention, the train occupancy range based on the train position can be set as the range that includes the no-slip-or-skid state range (the train occupancy range in a case where the occurrence of the slip-or-skid is not detected) and is wider than the no-slip-or-skid state range, when the occurrence of the slip-or-skid is detected for any one of the plurality of axles each provided with the rotation detector. This configuration can ensure safety regarding the train occupancy range, considering the fact that when slip-or-skid occurs, the error in the train position based on the detection signal from the rotation detector increases.

With this embodiment of the present invention, the train occupancy range can be appropriately set in accordance with which one of the slip and skid has occurred. Specifically, the axle involving the slip rotates with a rotation speed increased, and thus the train position based on the rotation detection signal from the rotation detector provided to this axle is situated forward from the actual train position. In view of this, the train occupancy range can be appropriately set on the basis of the backward-most one of the train positions each calculated for a corresponding one of the rotation detectors, that is, the train position based on the rotation detection signal from the rotation detector provided to an axle expected to involve no slip. Specifically, the axle involving the skid rotates with a reduced rotation speed, and thus the train position based on the rotation detection signal from the rotation detector provided to this axle is situated backward from the actual train position. In view of this, the train occupancy range can be appropriately set on the basis of the forward-most one of the train positions each calculated for a corresponding one of the rotation detectors, that is, the train position based on the rotation detection signal from the rotation detector provided to an axle expected to involve no skid.

In the on-board system, wherein the rotation detector may output the rotation detection signal as two pulse signals with a predetermined phase difference, for the rotation of an axle that is a detection target, and the on-board system may further perform calculating pulse period information for each of the pulse signals, and determining whether or not the rotation detector is abnormal on the basis of a difference between the two pulse signals, related to the same rotation detector, in the pulse period information.

With this embodiment of the present invention, whether or not the rotation detector is abnormal can be determined by using only signals output from the rotation detector. Specifically, the two pulse signals output from the single rotation detector are signals related to the rotation of a single axle as the detection target, and thus are supposed to have the same pulse period information. In view of this, whether or not the rotation detector is abnormal can be determined on the basis of whether or not the difference between the two pulse signals, output from the rotation detector, in the pulse period information, exceeds the predetermined threshold, for example.

In the on-board system, wherein the on-board system may further perform determining whether or not the rotation detector is abnormal, on the basis of whether or not the phase difference between the two pulse signals, related to the same rotation detector, is reversed.

With this embodiment of the present invention, whether or not the rotation detector is abnormal can be determined by using only signals output from the rotation detector. Specifically, the rotation detector outputs two pulse signals with a predetermined phase difference which does not change unless the axle stops rotating, that is, unless the train stops. In view of this, whether or not the rotation detector is abnormal can be determined on the basis of whether or not the phase difference between the two pulse signals, output from the rotation detector, is reversed.

In the on-board system, wherein the on-board system may further perform determining, on the basis of whether or not at least one of a speed and acceleration/deceleration based on the rotation detection signal satisfies a predetermined abnormality condition, whether or not the rotation detector that has output the rotation detection signal is abnormal.

With this embodiment of the present invention, whether or not the rotation detector is abnormal can be determined. Specifically, the speed and the acceleration/deceleration are limited within a range of values that can be obtained on the basis of the traveling performance of the train and the limited speed of the railway line. Thus, the abnormality of the rotation detection signal, that is, the abnormality of the rotation detector can be determined on the basis of the abnormality condition satisfied when a value outside the range of such values is obtained.

In the on-board system, wherein the on-board system may further perform calculating speeds from each of the rotation detection signals for each of the rotation detectors, and determining that, when a part of the calculated speeds each calculated for a corresponding one of the rotation detectors is zero for a predetermined maintained time and remaining of the calculated speeds is not zero, the rotation detector corresponding to the zero speed is abnormal or a signal line of the rotation detector is broken.

With this embodiment of the present invention, the abnormality of the rotation detector and the breakage of the signal line can be determined. Specifically, the speeds each calculated for a corresponding one of the rotation detectors are supposed to be the same. The train speed based on the rotation detection signal is zero when the rotation detector has failed and thus is outputting no rotation detection signal or when the signal line is broken. Thus, when a state where the speed based on the rotation detection signal from a part of the rotation detectors is zero, and the speed based on the rotation detection signal from the remaining rotation detectors is not zero is maintained, the rotation detector corresponding to the zero speed can be determined to be abnormal, or the signal line of the rotation detector can be determined to be broken.

Although an example of the embodiment which the present invention is applied is described below, the embodiments which can apply the present invention is not restricted to following embodiments.

[System Configuration]

FIG. 1 is a diagram illustrating a schematic configuration of a wireless train control system 1 according to the present embodiment. As illustrated in FIG. 1, the wireless train control system 1 includes: an on-board system 30 that is mounted on a train 20 that travels on a track R; and a ground system 10. The on-board system 30 and the ground system 10 can wirelessly communicate with each other through a predetermined wireless communication network. The wireless communication network is configured to provide contiguous communication areas along the track R. For example, this configuration may be achieved with a plurality of wireless base stations 12 provided along the track R, or with a loop antenna or a leaky coaxial cable (LCX) provided along the track R. Balise 40 for position correction are also provided along the track R.

The on-board system 30 calculates a train position and train speed of the train on the basis of a speed pulse obtained by a pulse generator (hereinafter, referred to as "PG"). When the train 20 passes through the balise 40, the train position is corrected with an absolute position associated with the balise 40. The on-board system 30 transmits information including a train ID, the train position, and the train speed of the train, to the ground system 10, and controls the traveling (speed) of the train on the basis of control information transmitted from the ground system 10.

For example, the ground system 10 is installed in a central control room and the like, and wirelessly communicates with the on-board system 30 to control each train 20 on the track R. Specifically, the ground system 10 generates control information for each train 20, and transmits the control information to the corresponding on-board system 30. The control information is generated on the basis of information (occupancy information) about a position of each train 20 based on travel information transmitted from the on-board system 30, route information obtained from an interlocking device (not illustrated), and the like.

[Principle]

(A) Train Occupancy Range

The train position calculated by the on-board system 30 is position of a predetermined portion (for example, a front end portion of the first vehicle) of the train. The position information about the train 20, transmitted from the on-board system 30 to the ground system 10, is a train occupancy range in which the train 20 may exist, determined on the basis of the train position.

Figure 2:
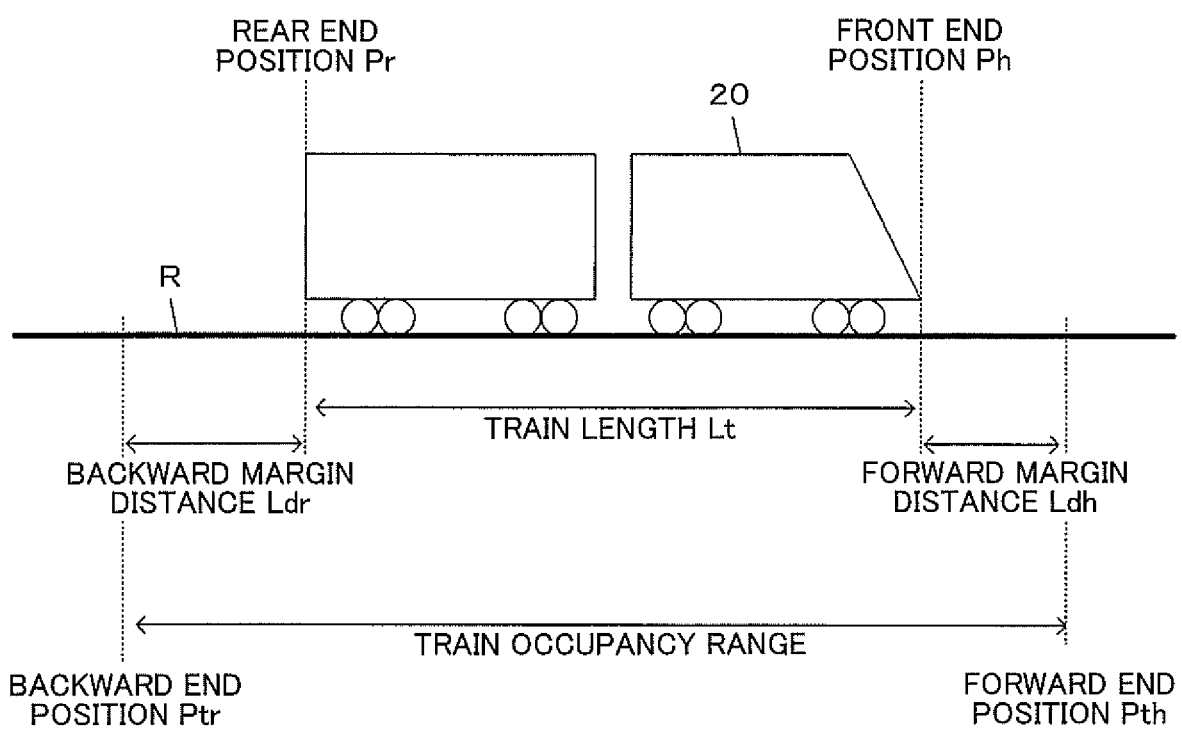
FIG. 2 is a diagram for explaining a train occupancy range.

FIG. 2 is a diagram for explaining the train occupancy range. The train occupancy range is a range determined on the basis of a train length Lt while taking account of a measurement error due to the PG. Specifically, the train length Lt is a length between a position Ph of a front end portion (front end position) of the first vehicle of the train 20 and a position Pr of a rear end portion (rear end position) of the last vehicle. Thus, the front end position Ph is obtained from the train position, and the rear end position Pr is obtained as a position situated backward from the front end position Ph by the train length Lt. The train occupancy range is between a forward end position Pth situated forward from the front end position Ph by a forward margin distance Ldh and a backward end position Ptr situated backward from the rear end position Pr by a backward margin distance Ldr. For example, the forward end position Pth and the backward end position Ptr are transmitted from the on-board system 30 to the ground system 10 as information indicating the train occupancy range.

(B) PG

Figure 3:
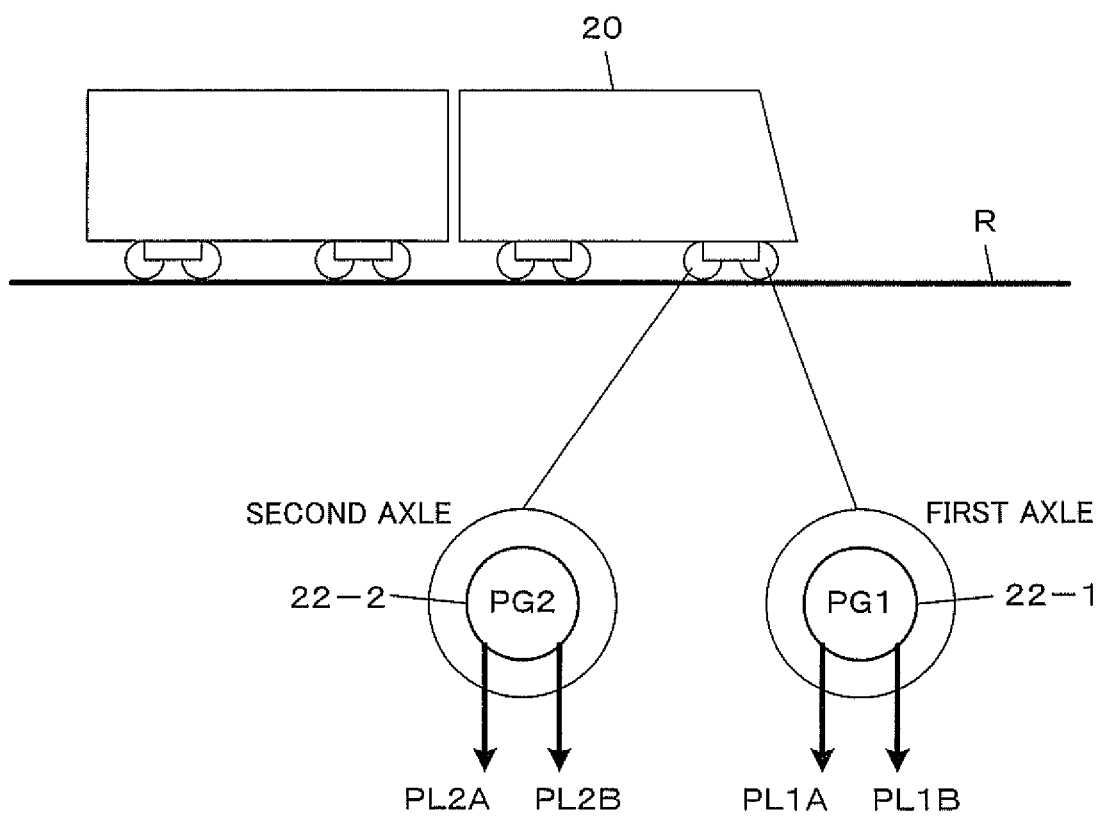
FIG. 3 is a diagram for explaining a PG provided to an axle of a train.

The train 20 has two PGs 22 (PGs 22-1 and 22-2), serving as rotation detectors, attached to different axles. For example, as illustrated in FIG. 3, the PGs 22-1 and 22-2 are respectively attached to first and second axles of the first vehicle. The PGs 22 each output pulse signals, with frequencies corresponding to the rotational speed of the attached axle, serving as two speed pulses PL of what are referred to as an A phase and a B phase, with a phase difference of 90°. Specifically, the PG 22-1 outputs two speed pulses PL1A and PL1B, and the PG 22-2 outputs two speed pulses PL2A and PL2B.

(C) PG Inspection

In the present embodiment, the on-board system 30 performs an inspection to check whether or not the PG 22 is normal, on the basis of the speed pulse PL output by the PG 22.

(C1) Speed Pulse PL

Specifically, whether or not the speed pulse PL output from the PG is appropriate is determined. More specifically, whether or not pulse counts of the speed pulses PL1A and PL1B, output from the PG 22-1, within a predetermined period match is determined. The PG 22-1 is determined to be abnormal when the pulse counts do not match. The pulse count within the predetermined period is one type of signal cycle information representing a cycle of the speed pulse PL that is a periodic signal. Similar determination is made on the PG 22-2 by using the speed pulses PL2A and PL2B.

The two speed pulses PL1 and PL2 output from a single PG 22 has a phase difference of 90°, and the phase lead/lag relationship is maintained while the train is traveling. This is because generally, the train 20 can only travel in a forward direction. Thus, for example, whether or not the phase lead/lag relationship between the two speed pulses PL1A and PL1B has been reversed from that at the time of traveling start is determined. The PG 22-1 is determined to be abnormal when the reversing has occurred. Similar determination is made on the PG 22-2 by using the speed pulses PL2A and PL2B.

(C2) Speed V

Furthermore, whether or not a speed V calculated on the basis of the speed pulse PL, output from the PG, is of an appropriate value is determined. Specifically, the PG 22-1 is determined to be abnormal when the speed V1, calculated from the speed pulses PL1A and PL1B output from the PG 22-1, satisfies a speed-related abnormality condition. The speed-related abnormality condition is satisfied when "the speed V exceeds a predetermined upper limit speed value". The upper limit speed value is determined on the basis of the vehicle performance of the train 20 or may be determined to be a speed higher (faster) than a maximum speed, set to a railway route in which the train 20 may travel, by a predetermined speed. Thus, the PG 22-1 is determined to be abnormal when the speed V1 exceeds the upper limit speed value. Similar determination is made on the PG 22-2 by using the speed pulses PL2A and PL2B.

(C3) Acceleration/Deceleration $\alpha$

Furthermore, whether or not acceleration/deceleration $\alpha$ calculated from the speed pulse PL output from the PG is of an appropriate value is determined. Specifically, the PG 22-1 is determined to be abnormal when acceleration/deceleration $\alpha 1$, calculated from the speed pulses PL1A and PL1B, output from the PG 22-1, satisfies an acceleration/deceleration-related abnormality condition. The acceleration/deceleration-related abnormality condition is satisfied "when the acceleration/deceleration $\alpha$ exceeds a predetermined acceleration/deceleration upper limit value". The acceleration/deceleration upper limit value is determined based on the vehicle performance of the train 20, a railway line condition such as the steepest gradient of the section in which the train 20 may travel, and the like. Thus, the PG 22-1 is determined to be abnormal when the acceleration/deceleration $\alpha 1$ exceeds the acceleration/deceleration upper limit value. Similar determination is made on the PG 22-2 by using the speed pulses PL2A and PL2B.

(C4) Breakage Detection

Furthermore, breakage of a signal line for outputting the speed pulse PL is detected, on the basis of the speed pulse PL output by the PG. Specifically, the speeds V1 and V2, calculated from the speed pulses PL1 and PL2 respectively output from the two PGs 22-1 and 22-2, are compared with each other. When one of the speeds is zero and the other one of the speeds is not zero and this state is maintained for a predetermined period of time or more, the PG 22 corresponding to the zero speed is determined to be abnormal due to the breakage of the signal line or this PG 22 itself is determined to be abnormal.

(C5) Abnormality Notification

Upon detecting the abnormality in the PG, the on-board system 30 transmits abnormality detection information, indicating the PG determined to have the abnormality, to the ground system 10, and activates the emergency brake to cause emergency stop of the train.

(D) Slip-or-Skid Detection

The on-board system 30 further detects an occurrence of slip or skid (hereinafter, collectively referred to as "slip-or-skid") on the basis of the speed pulse PL output by the PG. Specifically, the acceleration/deceleration $\alpha 1$, calculated from the speed pulses PL1A and PL1B output from the PG 22-1, is compared with a predetermined acceleration/deceleration threshold. When the acceleration/deceleration exceeds the threshold, slip-or-skid is determined to have occurred with the axle to which the PG 22-1 is attached.

Similar determination is made on the PG 22-2 by using the speed pulses PL2A and PL2B.

A speed difference ΔV between the speeds V1 and V2, calculated from the speed pulses PL1 and PL2 respectively output from the PGs 22-1 and 22-2, is compared with a predetermined threshold. When the speed difference ΔV exceeds the speed difference threshold, the slip-or-skid is determined to have occurred.

Figure 4:
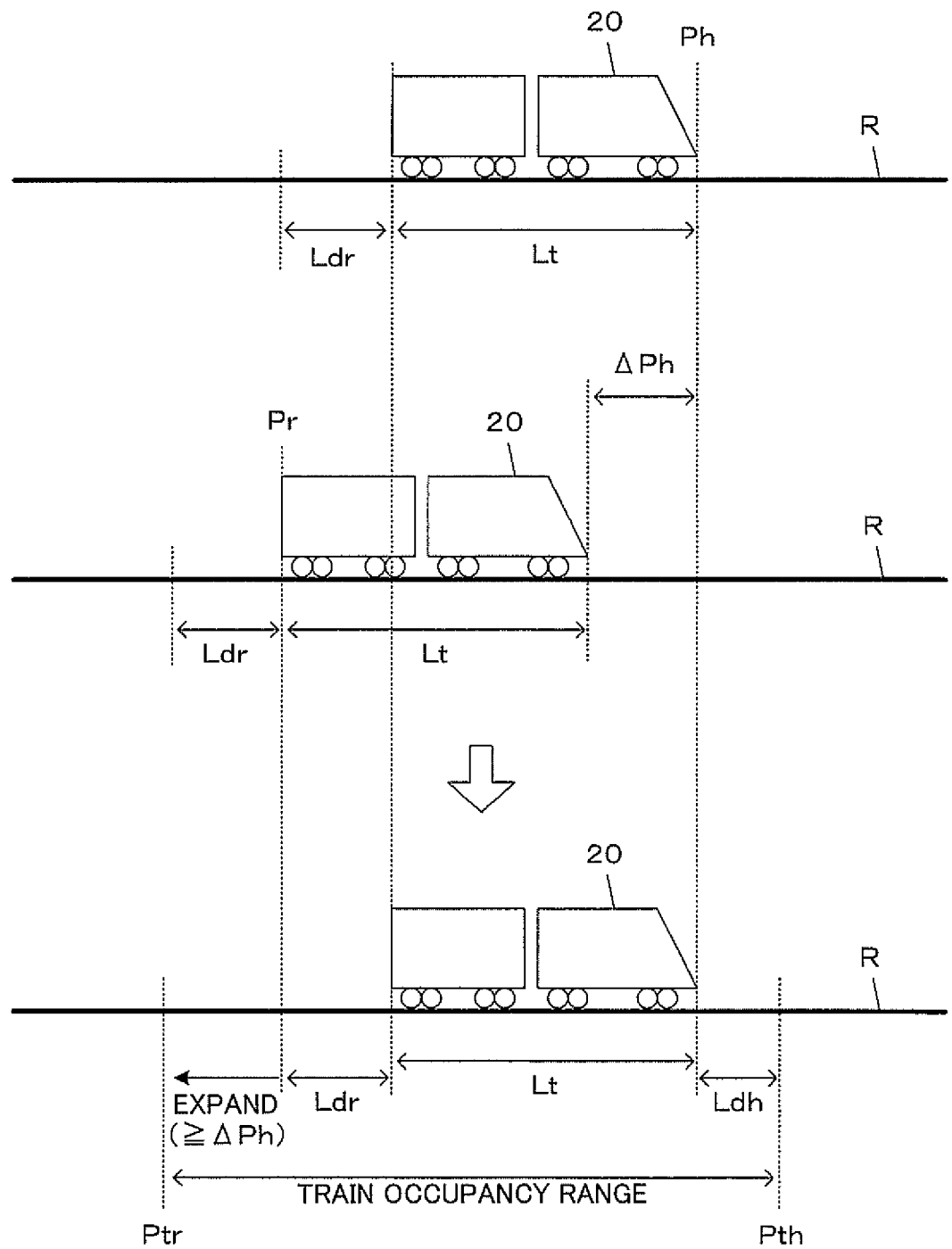
FIG. 4 is a diagram for explaining how a train occupancy range is set when slip-or-skid is detected.

When the slip-or-skid is determined to have occurred, the train occupancy range is set to be expanded as illustrated in FIG. 4 Specifically, a front end position Ph and a rear end position Pr are determined on the basis of a forward-side one of the train positions L1 and L2, calculated from the speed pulses PL1 and PL2 respectively output from the PGs 22-1 and 22-2. The train occupancy range is calculated with the backward margin distance Ldr expanded on the basis of the front end position Ph and the rear end position Pr. An expanded distance of the backward margin distance Ldr is determined to be equal to or larger than a difference ΔPh between the front end positions Ph1 and Ph2 respectively based on the train positions L1 and L2. Thus, the train occupancy range calculated includes a train occupancy range (this train occupancy range is referred to as a "no-slip-or-skid state range") with no slip-or-skid occurring, and is wider than the train occupancy range (no-slip-or-skid state range).

The train occupancy range finally calculated may be regarded as a range including a train occupancy range obtained through calculation based on the forward-most train position (upper section in FIG. 4) and a train occupancy range obtained through calculation based on the backward-most train position (middle section in FIG. 4).

[On-Board System]

Figure 5:
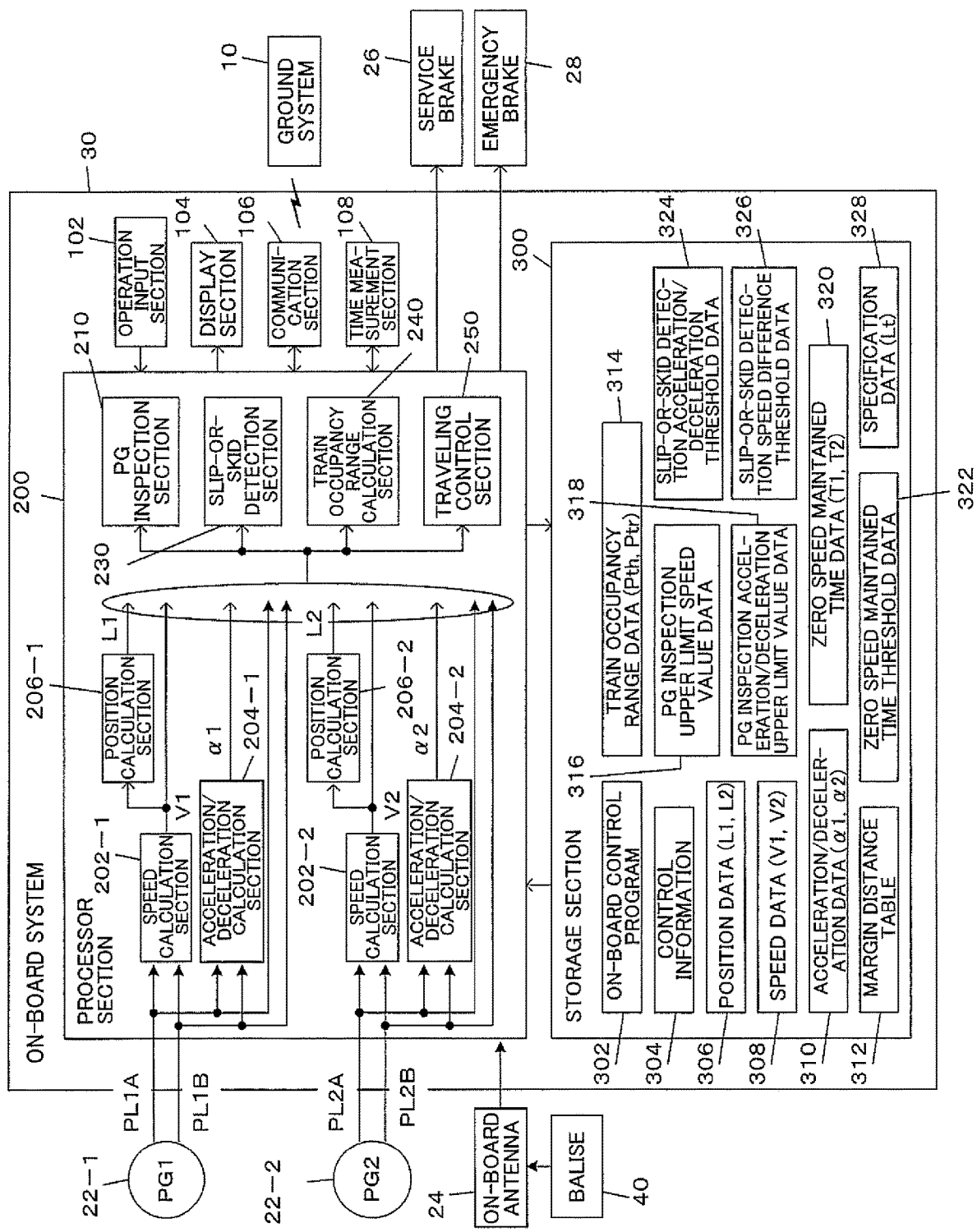
FIG. 5 is a diagram illustrating a functional configuration of an on-board system.

FIG. 5 is a block diagram illustrating a functional configuration of the on-board system 30. As illustrated in FIG. 5, the on-board system 30 is a kind of computer including an operation input section 102, a display section 104, a communication section 106, a time measurement section 108, a processor section 200, and a storage section 300.

For example, the operation input section 102 is implemented with an input device such as a keyboard, a touch panel, various switches, and various sensors, and outputs an operation signal, corresponding to an operation performed on the operation input section 102, to the processor section 200. For example, the display section 104 is implemented with a display device such as a light emitting diode (LED), and performs various types of displaying on the basis of a display signal from the processor section 200. The communication section 106 includes a wireless communication module and the like, and is connected to a wireless base station 12, to perform wireless communications with an external device including the ground system 10. The time measurement section 108 includes an oscillation circuit including a crystal oscillator, and outputs a time signal to the processor section 200. The time signal includes a current time measured, a time period elapsed after a designated timing, and the like.

For example, the processor section 200 is implemented with a computing device such as a central processing unit (CPU), and performs overall control on the on-board system 30, on the basis of a program and data stored in the storage section 300, data received via the communication section 106, and the like. The processor section 200 includes speed calculation sections 202-1 and 202-2, position calculation sections 206-1 and 206-2, acceleration/deceleration calculation sections 204-1 and 204-2, a PG inspection section 210, a slip-or-skid detection section 230, a train occupancy range calculation section 240, and a traveling control section 250.

The speed calculation sections 202-1 and 202-2 respectively calculate the train speeds V1 and V2 of the train on the basis of the speed pulses PL1 and PL2 output from the PGs 22-1 and 22-2. The two speed pulses PL output from a single PG are pulse signals with the same frequency and with phases different from each other by 90°. Thus, any one of the two speed pulses PL may be used as long as the PG is normal. The train speeds V1 and V2 calculated are stored as speed data 308.

The position calculation sections 206-1 and 206-2 respectively calculate current train positions L1 and L2 of the train on the basis of the speeds V1 and V2 calculated by the speed calculation sections 202-1 and 202-2. The train position L is calculated as a traveled distance in unit of kilometers. The train positions L1 and L2 thus calculated are stored as position data 306.

The acceleration/deceleration calculation sections 204-1 and 204-2 each calculate accelerations/decelerations α1 and α2 of the train, the basis of the speed pulses PL1 and PL2 respectively output from the PGs 22-1 and 22-2. When the PG is normal, any one of the two speed pulses PL output from the single PG may be used. The calculated accelerations/decelerations α1 and α2 are stored as acceleration/deceleration data 310.

The PG inspection section 210 determines whether or not the PGs 22-1 and 22-2 are normal, on the basis of the speed pulses PL1A, PL1B, PL2A, and PL2B output from each of the PGs 22-1 and 22-2, the speeds V1 and V2 calculated by the speed calculation sections 202-1 and 202-2, and the accelerations/decelerations α1 and α2 calculated by the acceleration/deceleration calculation sections 204-1 and 204-2.

Figure 6:
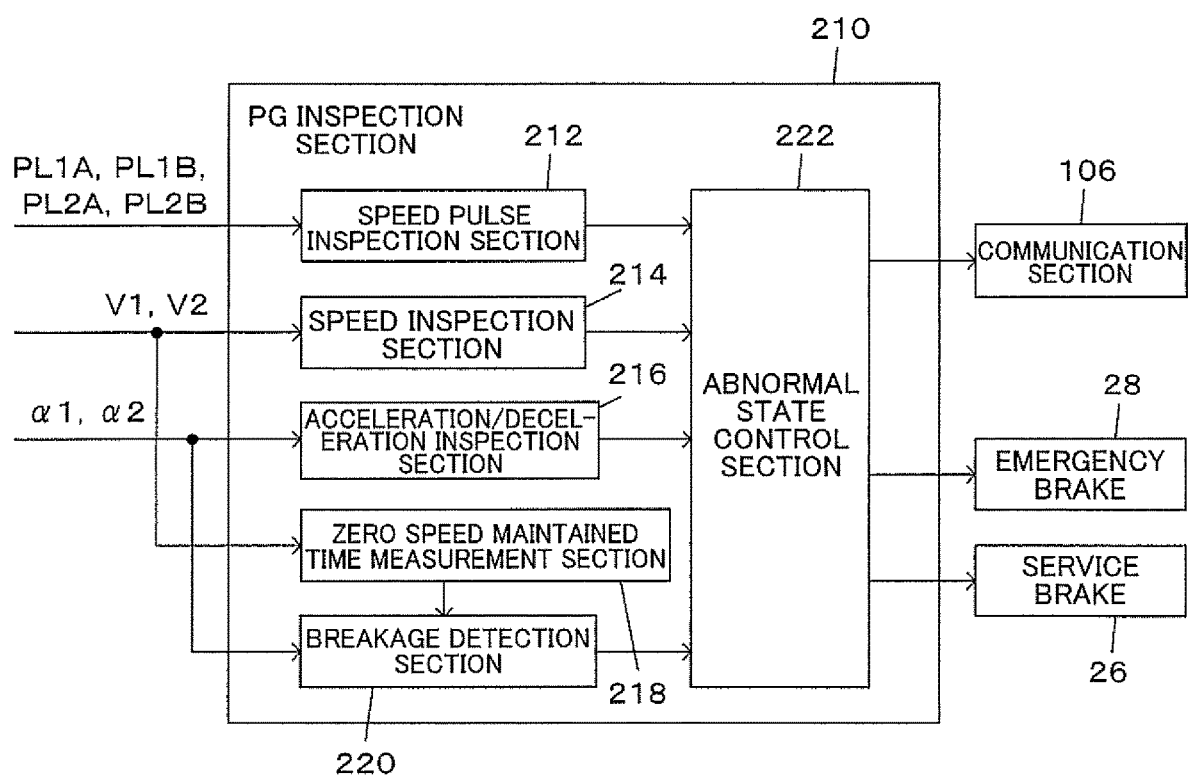
FIG. 6 is a diagram illustrating a functional configuration of a PG inspection section.

FIG. 6 is a diagram illustrating a configuration of the PG inspection section 210. As illustrated in FIG. 6, the PG inspection section 210 includes a speed pulse inspection section 212, a speed inspection section 214, an acceleration/deceleration inspection section 216, a zero speed maintained time measurement section 218, a breakage detection section 220, and an abnormal state control section 222.

The speed pulse inspection section 212 determines whether or not the two speed pulses PL output by each of the PGs 22-1 and 22-2 are appropriate. More specifically, whether or not pulse counts of the speed pulses PL1A and PL1B, output from the PG 22-1, within a predetermined period match is determined. The PG 22-1 is determined to be abnormal when the pulse counts do not match. Furthermore, for example, whether or not the phase lead/lag relationship between the two speed pulses PL1A and PL1B has been reversed from that at the time of traveling start is determined. The PG 22-1 is determined to be abnormal when the reversing has occurred. Similar determination is made on the PG 22-2 by using the speed pulses PL2A and PL2B.

The speed inspection section 214 determines whether or not the speeds V1 and V2 are of appropriate values, for each of the PG 22-1 and 22-2. Specifically, the PG 22-1 is determined to be abnormal when the speed V1 calculated from the speed pulses PL1A and PL1B output from the PG 22-1 exceeds a predetermined upper limit speed value. The same applies to the speed V2 of the PG 22-2. The upper limit speed value is stored as PG inspection upper limit speed value data 316 in advance.

The acceleration/deceleration inspection section 216 determines whether or not the accelerations/decelerations α1 and α2 are of appropriate values for each of the PGs 22-1 and 22-2. Specifically, the PG 22-1 is determined to be abnormal when the acceleration/deceleration α1, calculated from the speed pulses PL1A and PL1B output from the PG 22-1, exceeds a predetermined acceleration/deceleration upper limit value. The same applies to the acceleration/deceleration α2 of the PG 22-2. The acceleration/deceleration upper limit value is stored in advance as PG inspection acceleration/deceleration upper limit value data 318.

The zero speed maintained time measurement section 218 measures times T1 and T2 during which the speeds V1 and V2 are maintained to be zero for each of the PGs 22-1 and 22-2. The measured times T1 and T2 are stored as zero speed maintained time data 320.

The breakage detection section 220 detects breakage of a signal line for outputting the speed pulse PL, on the basis of the speed pulse PL output by each of the PGs 22-1 and 22-2. Specifically, the speeds V1 and V2 are compared with each other. When one of the speeds is zero and the other one of the speeds is not zero, and when a zero speed maintained time T of the PG during which the zero speed V is maintained reaches a predetermined maintained time threshold, the PG corresponding to the zero speed V is determined to be abnormal due to breakage of the signal line or a failure of the PG 22. The maintained time threshold is stored in advance as zero speed maintained time threshold data 322.

When any one of the speed pulse inspection section 212, the speed inspection section 214, the acceleration/deceleration inspection section 216, and the breakage detection section 220 determines that the PG is abnormal, the abnormal state control section 222 transmits abnormality detection information, indicating the PG determined to be abnormal, to the ground system 10 and activates the emergency brake 28 to cause emergency stop of the train.

The slip-or-skid detection section 230 detects occurrence of slip-or-skid on the basis of the speed pulse PL output from each of the PGs 22-1 and 22-2. Specifically, the acceleration/deceleration α1 is compared with a predetermined acceleration/deceleration threshold. When the acceleration/deceleration α1 exceeds the acceleration/deceleration threshold, the slip-or-skid of the axle is determined to have occurred with the axle to which the PG 22-1 is attached. The same applies to the acceleration/deceleration α2 of the PG 22-2. The speed difference ΔV between the speeds V1 and V2 is compared with a predetermined speed difference threshold. When the speed difference ΔV exceeds the speed difference threshold, the slip-or-skid is determined to have occurred. The acceleration/deceleration threshold is stored in advance as slip-or-skid detection acceleration/deceleration threshold data 324. The speed difference threshold is stored in advance as slip-or-skid detection speed difference threshold data 326.

The train occupancy range calculation section 240 calculates the train occupancy range of the train, on the basis of the train positions L1 and L2 calculated by the position calculation sections 206-1 and 206-2. Specifically, when no occurrence of slip-or-skid is detected by the slip-or-skid detection section 230, the front end position Ph and the rear end position Pr of the train are determined on the basis of the train positions L1 and L2. Then, a train occupancy range (no-slip-or-skid state range) is calculated as a range between the backward end position Ptr situated backward from the rear end position Pr by the backward margin distance Ldr and the forward end position Pth situated forward from the front end position Ph by the forward margin distance Ldh (see FIG. 2).

When the slip-or-skid detection section 230 detects an occurrence of the slip-or-skid, a range that includes the no-slip-or-skid state range and is wider than the no-slip-or-skid state range is calculated as the train occupancy range. When the slip-or-skid occurs, the axles to which the PGs 22-1 and 22-2 are attached are different from each other in the rotational speed. Thus, the speeds V1 and V2 as well as the train positions L1 and L2, calculated from the speed pulses PL output by the PGs 22-1 and 22-2, are different from each other. Thus, the front end position Ph and the rear end position Pr are determined on the basis of the forward-side one of the train positions L1 and L2, calculated from the speed pulses PL1 and PL2 respectively output by the PG 22-1 and 22-2. An expanded distance of the backward margin distance Ldr is determined to be larger than the difference ΔPh between the front end positions Ph1 and Ph2 respectively based on the train positions L1 and L2. Then, the train occupancy range is calculated as a range between the backward end position Ptr situated backward from the rear end position Pr by a distance as sum of the expanded distance and the backward margin distance Ldr and the forward end position Pth situated forward from the front end position Ph by the forward margin distance Ldh (see FIG. 4).

The train length Lt of the train is included in specification data 328. Examples of other data in the specification data 328 include the maximum speed and the maximum acceleration related to the traveling of the train, and the maximum deceleration achieved with a service brake. The forward margin distance Ldh and the backward margin distance Ldr are stored as a margin distance table 312. For example, the forward end position Pth and the backward end position Ptr of the calculated train occupancy range are stored as train occupancy range data 314.

The traveling control section 250 controls the traveling (speed) of the train on the basis of control information 304 received from the ground system. Specifically, a speed check pattern is generated for making the train stop at a stop target designated by the control information 304, on the basis of a railway line condition, a traveling performance of the train, and the like. Then, a checked speed corresponding to the current train position determined with the speed check pattern and the current train speed of the train are compared with each other. When the train speed is higher than the checked speed, the train is decelerated by activating a service brake 26.

The storage section 300 is implemented by a storage device such as a read only memory (ROM), a random access memory (RAM), or hard disk. The storage section 300 stores a program and data for causing the processor section 200 to integrally control the on-board system 30. The storage section 300 is used as a work area for the processor section 200, and temporarily stores the results of calculations performed by the processor section 200, data received via the communication section 106, and the like. The storage section 300 stores the on-board control program 302, the control information 304, the position data 306, the speed data 308, the acceleration/deceleration data 310, the margin distance table 312, the train occupancy range data 314, the PG inspection upper limit speed value data 316, the PG inspection acceleration/deceleration upper limit value data 318, the zero speed maintained time data 320, the zero speed maintained time threshold data 322, the slip-or-skid detection acceleration/deceleration threshold data 324, the slip-or-skid detection speed difference threshold data 326, and the specification data 328.

[Process Flow]

Figure 7:
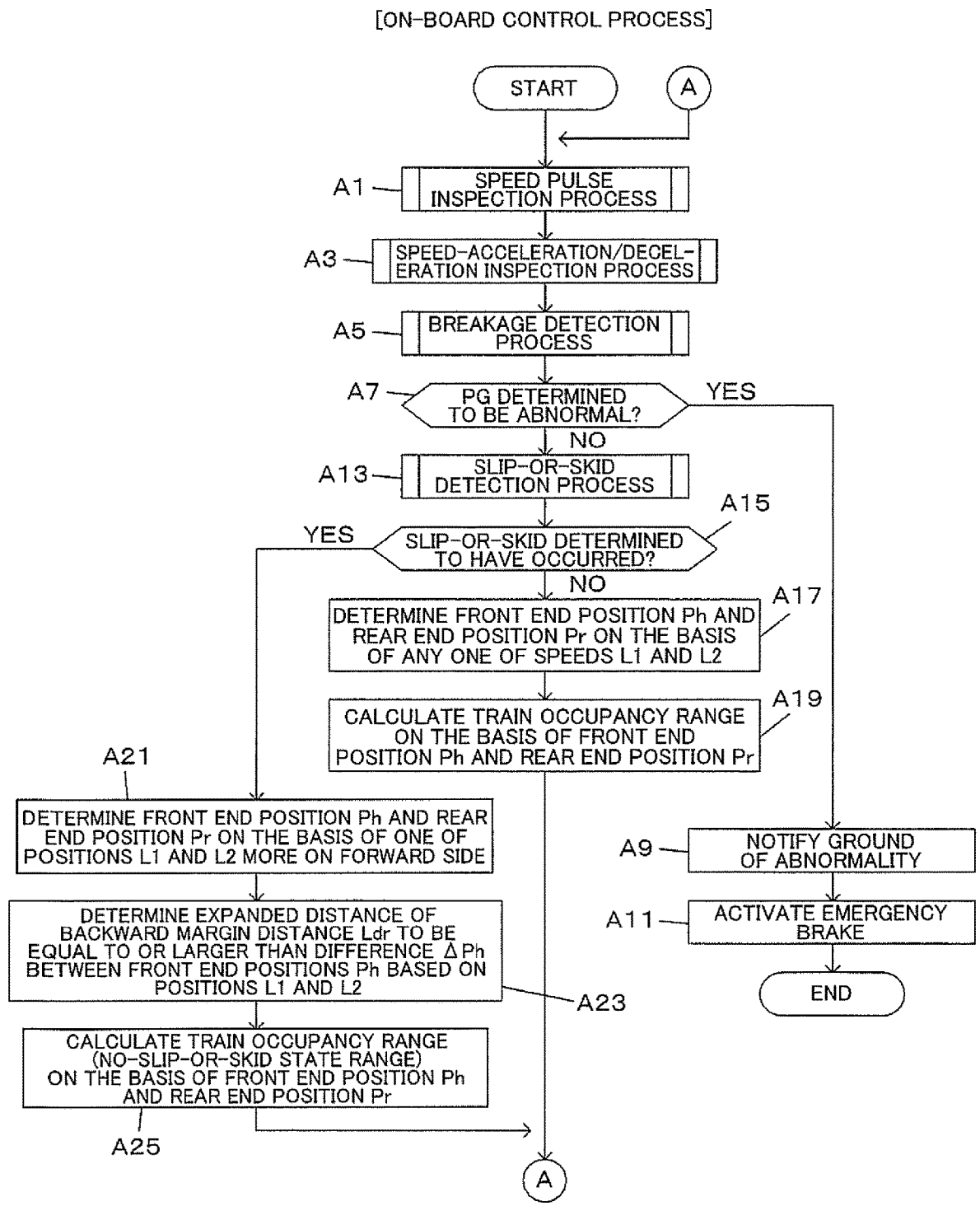
FIG. 7 is a flowchart illustrating a flow of an on-board control process.

FIG. 7 is a flowchart illustrating a flow of an on-board control process performed by the on-board system 30. This process is implemented with the processor section 200 executing the on-board control program 302

Figure 8:
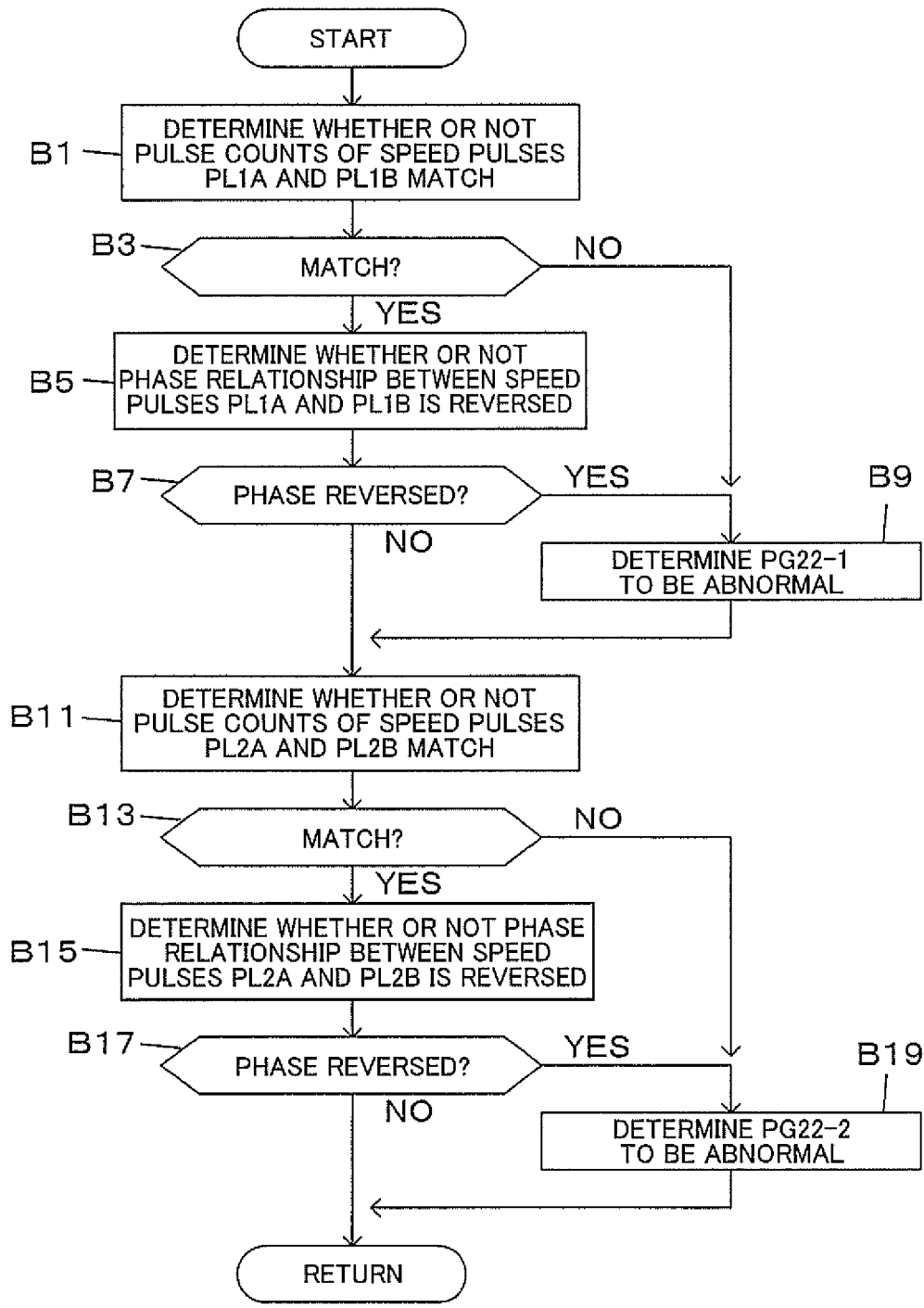
FIG. 8 is a flowchart illustrating a speed pulse inspection process.

First of all, the speed pulse inspection section 212 performs a speed pulse inspection process (step A1). FIG. 8 is a flowchart illustrating a flow of the speed pulse inspection process. As illustrated in FIG. 8, in the speed pulse inspection process, the speed pulse inspection section 212 determines whether or not the pulse counts of the speed pulses PL1A and PL1B within the predetermined period match for the PG 22-1 (step B1). When the counts do not match (step B3: NO), the PG 22-1 is determined to be abnormal (step B9). Furthermore, whether or not the phase lead/lag relationship between the speed pulses PL1A and PL1B is reversed is determined (step B5). When the reversing has occurred (step B7: YES), the PG 22-1 is determined to be abnormal (step B9).

Next, whether or not the pulse counts of the speed pulses PL2A and PL2B within the predetermined period match is determined (step B11). When the counts do not match (step B13: NO), the PG 22-2 is determined to be abnormal (step B19). Furthermore, whether or not the phase lead/lag relationship between the speed pulses PL2A and PL2B is reversed is determined (step B15). When the reversing has occurred (step B17: YES), the PG 22-2 is determined to be abnormal (step B19). When this process is completed, the pulse inspection process is terminated.

Figure 9:
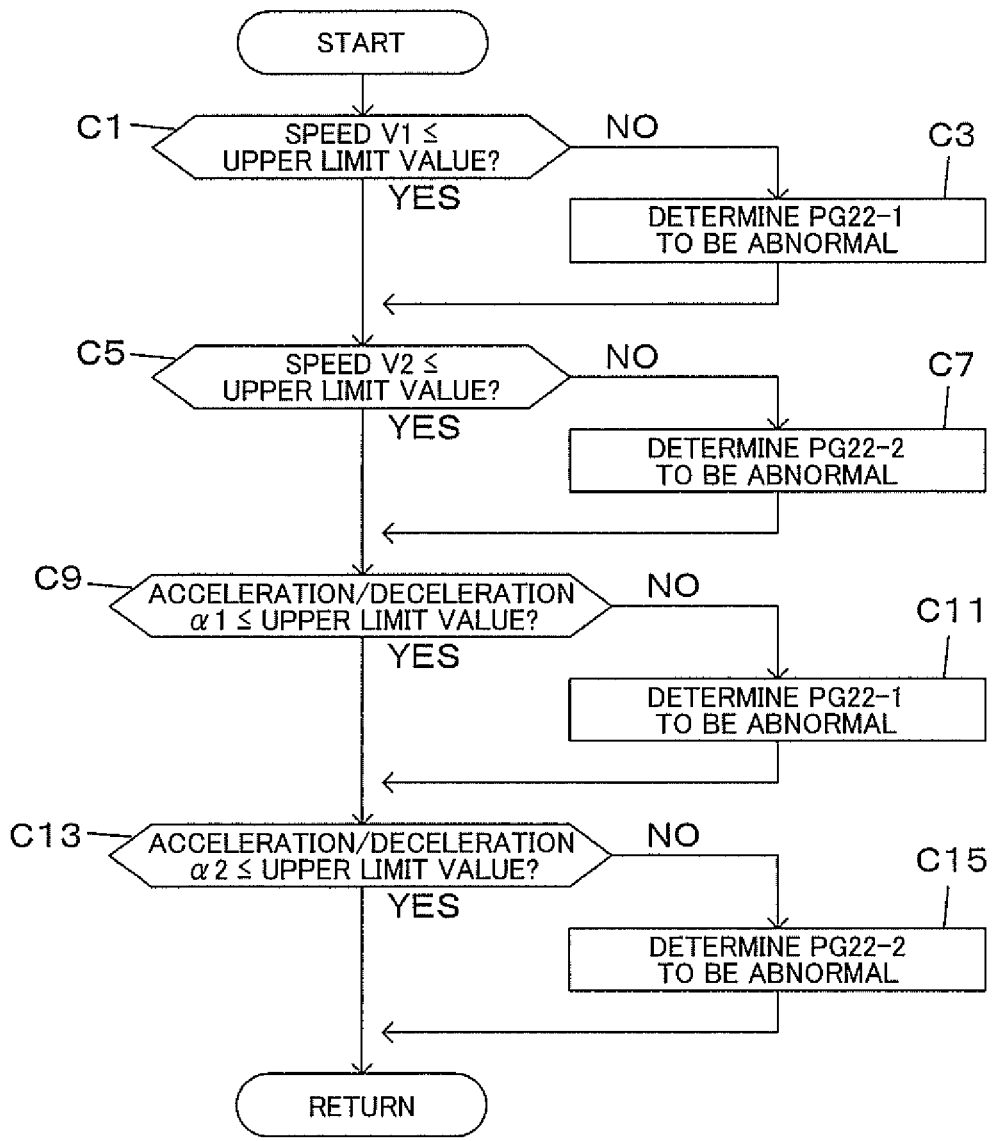
FIG. 9 is a flowchart illustrating a speed-acceleration/deceleration inspection process.

Referring back to FIG. 7, next, the speed inspection section 214 and the acceleration/deceleration inspection section 216 perform a speed-acceleration/deceleration inspection process (step A3). FIG. 9 is a flowchart illustrating a flow of the speed-acceleration/deceleration inspection process. As illustrated in FIG. 9, in the speed-acceleration/deceleration inspection process, the speed inspection section 214 compares the speed V1 with the predetermined upper limit speed value. When the speed V1 exceeds the upper limit speed value (step C1: NO), the PG 22-1 is determined to be abnormal (step C3). Furthermore, the speed V2 is compared with the upper limit speed value. When the speed V2 exceeds the upper limit speed value (step C5: NO), the PG 22-2 is determined to be abnormal (step C7).

Next, the acceleration/deceleration inspection section 216 compares the acceleration/deceleration $\alpha 1$ with the predetermined acceleration/deceleration upper limit value. When the acceleration/deceleration $\alpha 1$ exceeds the acceleration/deceleration upper limit value (step C9: NO), the PG 22-1 is determined to be abnormal (step C11). Furthermore, the acceleration/deceleration $\alpha 2$ is compared with the acceleration/deceleration upper limit value. When the acceleration/deceleration $\alpha 2$ exceeds the acceleration/deceleration upper limit value (step C13: NO), the PG 22-2 is determined to be abnormal (step C15). When this process is completed, the speed-acceleration/deceleration inspection process is terminated.

Figure 10:
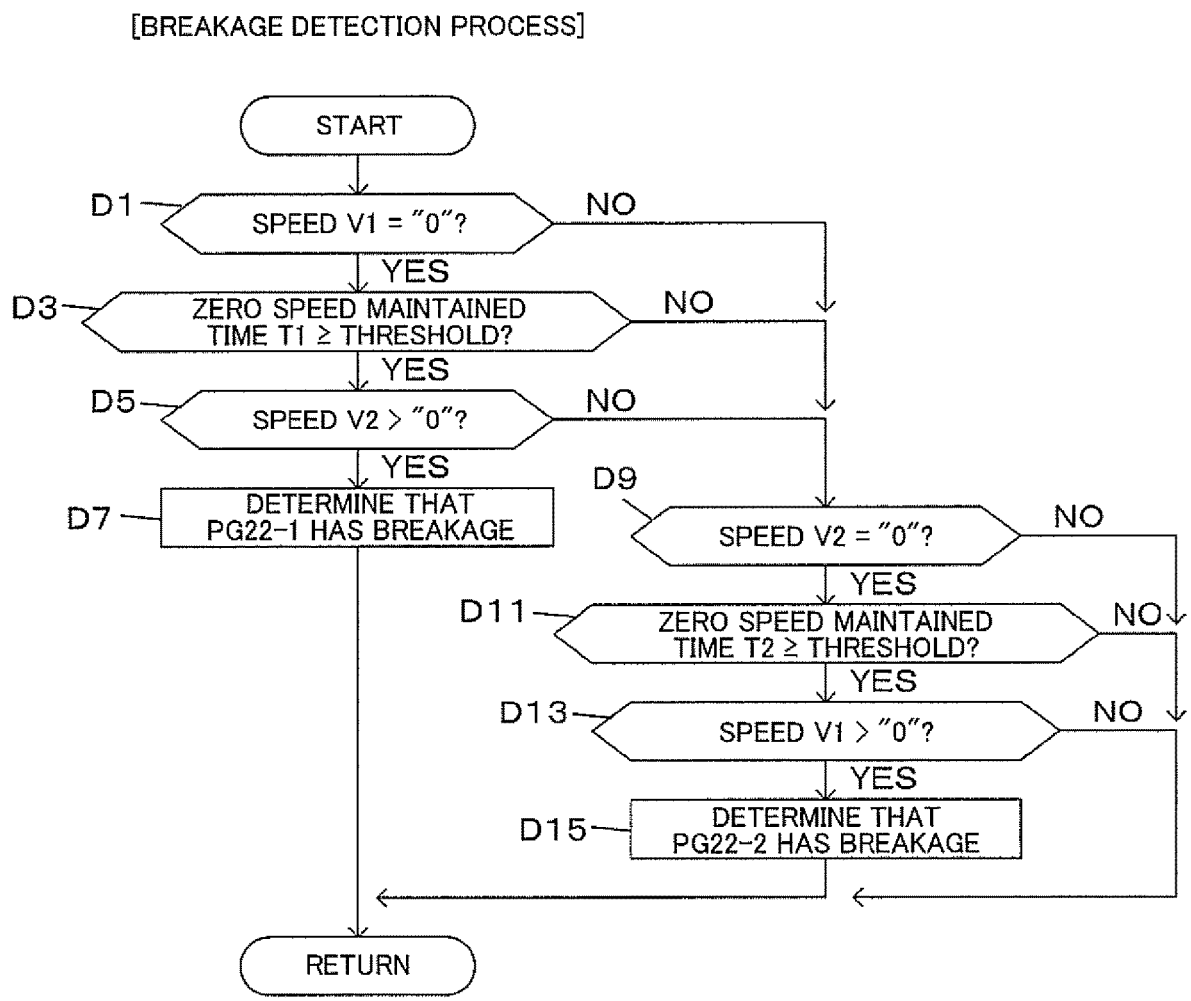
FIG. 10 is a flowchart illustrating a breakage detection process.

Referring back to FIG. 7, next, the breakage detection section 220 performs a breakage detection process (step A5). FIG. 10 is a flowchart illustrating a flow of the breakage detection process. As illustrated in FIG. 10, in the breakage detection process, the breakage detection section 220 determines that the PG 22-1 is abnormal due to breakage (step D7), when the speed V1 is zero (step D1: YES), the time T1 during which the speed V1 is zero exceeds the zero speed maintained time threshold (step D3: YES), and the speed V2 is larger than zero (not zero) (step D5: YES).

The PG 22-2 is determined to be abnormal due to breakage (step D15), when the speed V2 is zero (step D9: YES), the time T2 during which the speed V2 is zero exceeds the zero speed maintained time threshold (step D11: YES), and the speed V1 is larger than zero (not zero) (step D13: YES). When this process is completed, the breakage detection process is terminated.

Referring back to FIG. 7, whether or not the PG 22-1 and/or 22-2 is determined to be abnormal as a result of the speed pulse inspection process, the speed-acceleration/deceleration inspection process, and the breakage detection process is determined. When at least one of the PGs 22-1 and 22-2 is determined to be abnormal (step A7: YES), the abnormal state control section 222 transmits the abnormality detection information indicating the PG 22 determined to be abnormal to the ground system 10 (step A9), and activates the emergency brake 28 to cause the emergency stop of the train (step A11).

Figure 11:
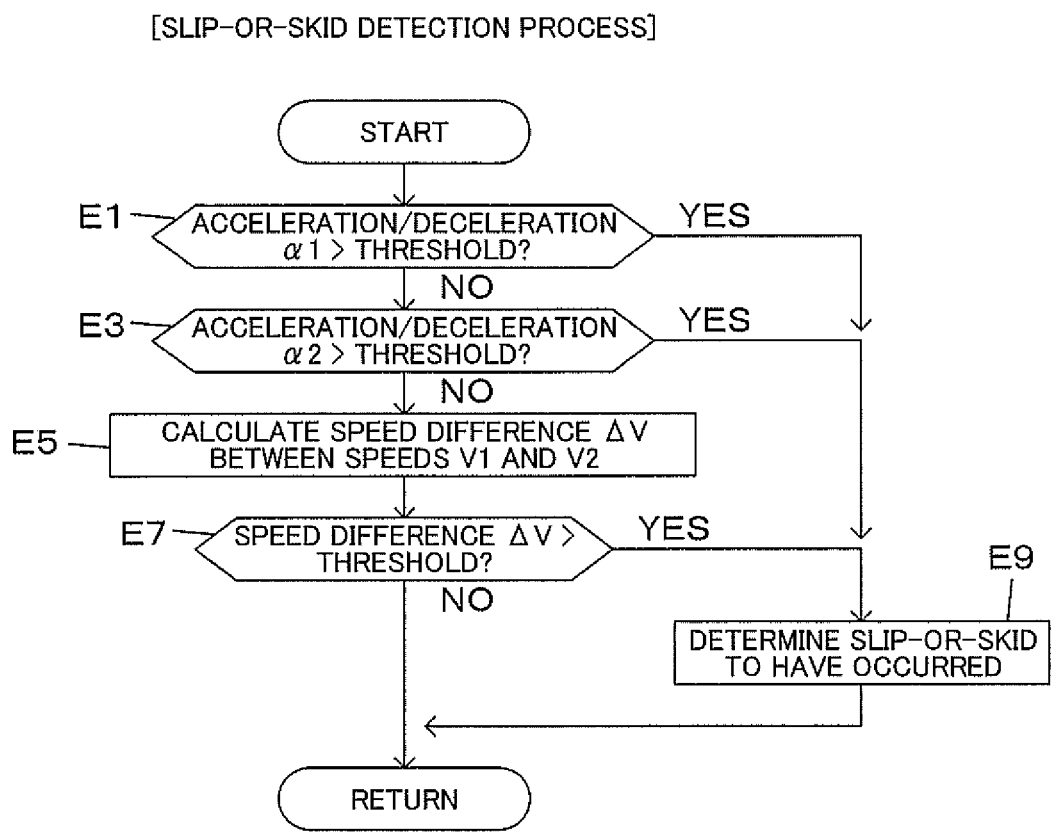
FIG. 11 is a flowchart illustrating a slip-or-skid detection process.

When none of the PGs 22-1 and 22-2 is determined to be abnormal (step A7: NO), the slip-or-skid detection section 230 performs the slip-or-skid detection process. FIG. 11 is a flowchart illustrating a flow of the slip-or-skid detection process. As illustrated in FIG. 11, the slip-or-skid detection section 230 compares the acceleration/deceleration $\alpha 1$ with the predetermined acceleration/deceleration threshold. When the acceleration/deceleration $\alpha 1$ exceeds the acceleration/deceleration threshold (step E1: YES), the slip-or-skid of the axle is determined to have occurred with the axle to which the PG 22-1 is attached (step E9). Furthermore, the acceleration/deceleration $\alpha 2$ is compared with the acceleration/deceleration threshold. When the acceleration/deceleration $\alpha 2$ exceeds the acceleration/deceleration threshold (step E3: YES), the slip-or-skid of the axle is determined to have occurred with the axle to which the PG 22-2 is attached (step E9).

The speed difference $\Delta V$ between the speeds V1 and V2 is calculated (step E5). The speed difference $\Delta V$ is compared with the predetermined speed difference threshold. When the speed difference $\Delta V$ exceeds the speed difference threshold (step E7: YES), the slip-or-skid is determined to have occurred (step E9). When this process is completed, the slip-or-skid detection process is terminated.

Referring back to FIG. 7, next, the train occupancy range calculation section 240 calculates the train occupancy range.

Specifically, when the slip-or-skid is not determined to have occurred through the slip-or-skid detection process (step A15: NO), the front end position Ph and the rear end position Pr of the train are determined on the basis of any one of the train positions L1 and L2 (step A17). The train occupancy range (no-slip-or-skid state range) is calculated on the basis of the front end position Ph and the rear end position Pr (step A19).

When the slip-or-skid is determined to have occurred (step A15: YES), the front end position Ph and the rear end position Pr of the train are determined on the basis of one of the train positions L1 and L2 more on the forward side than the other (step A21). The expanded distance of the backward margin distance Ldr is determined to be equal to or larger than the difference $\Delta Ph$ between the front end positions Ph based on the train positions L1 and L2 (step A23). Then, the train occupancy range is calculated as a range between the backward end position Ptr situated backward from the rear end position by the distance obtained by adding the expanded distance to the backward margin distance Ldr and the forward end position Pth situated forward from the front end position Ph by the forward margin distance Ldh (step A25). When this process is completed, the process returns to step S1, and the similar process is repeated.

Advantageous Effects

As described above, in the present embodiment, whether or not the slip-or-skid of the axle has occurred with any one of the plurality of different axles provided with the PGs 22-1 and 22-2 is determined on the basis of the speed pulses PL output by the PGs 22-1 and 22-2 provided to the axles. When the occurrence of the slip-or-skid is detected, the front end position Ph of the train is determined on the basis of a forward-side one of the train positions L1 and L2 based on the speed pulses PL output by the PG 22-1 and 22-2 more on the forward side than the other. The rear end position Pr is determined on the basis of the one of the train position more on the backward side. Then, the train occupancy range is calculated, and thus can be calculated to include the no-slip-or-skid state range that is a train occupancy range in a case where the occurrence of the slip-or-skid is not detected, and to be wider than the no-slip-or-skid state range.

When the slip-or-skid occurs, the error in the train position based on the detection signal from the rotation detector increases, and thus the train occupancy range is calculated to be wide to ensure safety. The train position L based on the speed pulse from the PG provided to the axle with the slip-or-skid includes an error corresponding to the level of the slip-or-skid that has occurred. Thus, the train occupancy range is calculated by using the train position including no error due to slip-or-skid and the train position including the error due to the slip-or-skid, whereby the train occupancy range can be calculated to have an appropriate range length when the slip-or-skid occurs.

The abnormality of the PG 22 can be determined on the basis of the speed pulse PL, the speed V and the acceleration/deceleration α calculated from the speed pulse PL, and the train position L.

[Modifications]

The invention is not limited to the above embodiments. Various modifications and variations may be made without departing from the scope of the invention.

(A) Slip/Skid Detection

The slip-or-skid may be detected with occurrence of each the slip and the skid separately detected. Specifically, slip of the axle occurs during power running, and results in the rotational speed of the axle with the slip of the axle being faster than the rotational speed of a normal axle (adhesion axle). Skid of the axle occurs during braking, and results in the rotational speed of the axle with the skid of the axle being slower than the rotational speed of the normal axle (adhesion axle). The driving status such as power running and braking can be determined on the basis of a drive operation signal from a cab and the acceleration/deceleration α for example. Thus, whether the slip has occurred or the skid has occurred can be determined on the basis of the driving status (the power running or the braking).

Figure 12A:
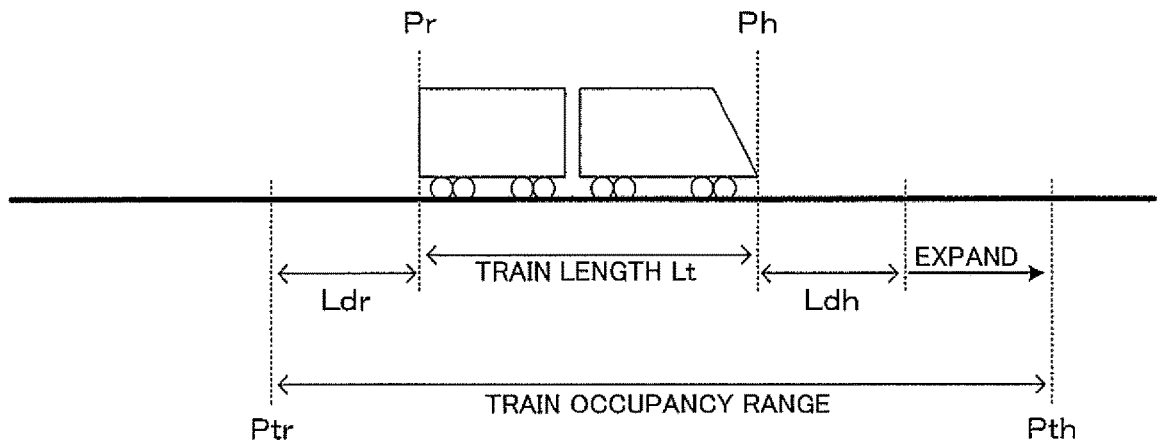
FIG. 12A and FIG. 12B are diagrams for explaining how a train occupancy range is set when slip and skid are detected, respectively.
Figure 12B:
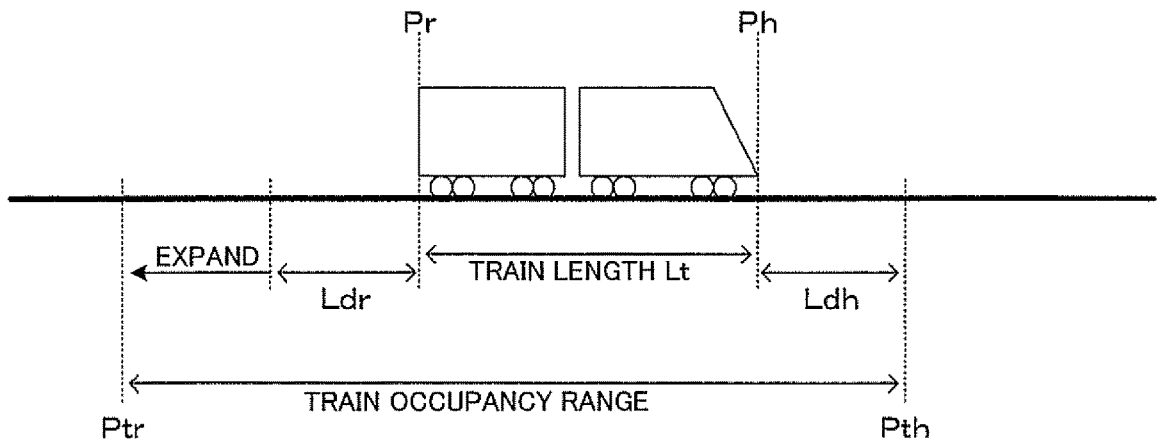

Then, the train occupancy range is calculated in accordance with which one of the slip and the skid has occurred, as illustrated in FIGS. 12A and 12B. Specifically, when the slip occurs, the front end position Ph and the rear end position Pr of the train are determined on the basis of one of the train positions L1 and L2 calculated from the speed pulse corresponding to the axle with no slip (the axle with backward one of the train positions calculated), as illustrated in FIG. 12A. Then, the train occupancy range is calculated with the forward margin distance Ldh expanded. This is because the train position calculated from the speed pulse corresponding to the axle with no slip of the axle is likely to be more accurate than the train position calculated from the speed pulse corresponding to the axle with the slip of the axle.

When the skid occurs, the front end position Ph and the rear end position Pr of the train are determined on the basis of one of the train positions L1 and L2 calculated from the speed pulse corresponding to the axle with no skid (the axle with forward one of the train positions calculated), as illustrated in FIG. 12B. Then, the train occupancy range is calculated with the backward margin distance Ldr expanded. This is because the train position calculated from the speed pulse corresponding to the axle with no skid is more likely to be accurate than the train position calculated from the speed pulse corresponding to the axle with the skid.

(B) Three or More PGs

The two PGs 22-1 and 22-2 are attached to two different axles. However, this should not be construed in a limiting sense, and the PG 22 may be provided to each of three or more axles.

(C) Phase Difference Between Two Speed Pulses

The phase difference between the two speed pulses PL output by a single PG 22 is not limited to 90°, and may be other angles such as 45° or 120°.

(D)

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

What is claimed is:

1. An on-board system calculating a train occupancy range in which a train may exist, wherein
the train is provided with rotation detectors that are each provided to a corresponding one of a plurality of axles of the train and each output a rotation detection signal corresponding to rotation of the axle, the on-board system performing:
calculating train positions of the train for each of the rotation detectors on the basis of the rotation detection signal from corresponding the rotation detector;
detecting an occurrence of slip-or-skid of a wheel for any one of the plurality of axles, by using the rotation detection signals from the rotation detectors;
setting, when the occurrence of the slip-or-skid is not detected, a no-slip-or-skid state range that is a train occupancy range including a range of a train length of the train based on any of train positions obtained for each of the rotation detectors, a range of a forward margin distance of the train, and a range of a backward margin distance of the train; and
setting, when the occurrence of the slip-or-skid is detected, the train occupancy range to be a range that includes a range of the train length based on a forwardmost one of the train positions obtained for each of the rotation detectors, the range of the forward margin distance, and a range obtained by expanding the range of the backward margin distance backward by a distance equal to or larger than a difference between the train positions obtained for each of the rotation detectors, to be a range that includes the no-slip-or-skid state range and is wider than the no-slip-or-skid state range.

2. An on-board system calculating a train occupancy range in which a train may exist, wherein
the train is provided with rotation detectors that are each provided to a corresponding one of a plurality of axles of the train and each output a rotation detection signal corresponding to rotation of the axle, the on-board system performing:
calculating train positions of the train for each of the rotation detectors on the basis of the rotation detection signal from corresponding the rotation detector;

detecting an occurrence of slip of a wheel and an occurrence of skid of a wheel for the plurality of axles, by using the rotation detection signals from the rotation detectors;

setting, when the occurrence of any one of the slip and skid is not detected, a no-slip-or-skid state range that is the train occupancy range including a range of a train length of the train based on any one of the train positions obtained for each of the rotation detectors, a range of a forward margin distance of the train, and a range of a backward margin distance of the train;

setting, when the occurrence of the slip is detected, the train occupancy range to be a range including a range of the train length based on a backward-most one of the train positions obtained for each of the rotation detectors, a range obtained by expanding forward the range of the forward margin distance, and the range of the backward margin distance, to be a range that includes the no-slip-or-skid state range and is wider than the no-slip-or-skid state range; and setting, when the occurrence of the skid is detected, the train occupancy range to be a range including a range of the train length based on a forward-most one of the train positions obtained for each of the rotation detectors, the range of the forward margin distance, and a range obtained by expanding backward the range of the backward margin distance, to be a range that includes the no-slip-or-skid state range and is wider than the no-slip-or-skid state range.

3. The on-board system according to claim 1, wherein the rotation detector outputs the rotation detection signal as two pulse signals with a predetermined phase difference, for the rotation of an axle that is a detection target, and the on-board system further performs:
calculating pulse period information for each of the pulse signals, and
determining whether or not the rotation detector is abnormal on the basis of a difference between the two pulse signals, related to the same rotation detector, in the pulse period information.

4. The on-board system according to claim 2, wherein the rotation detector outputs the rotation detection signal as two pulse signals with a predetermined phase difference, for the rotation of an axle that is a detection target, and the on-board system further performs:
calculating pulse period information for each of the pulse signals, and
determining whether or not the rotation detector is abnormal on the basis of a difference between the two pulse signals, related to the same rotation detector, in the pulse period information.

5. The on-board system according to claim 3, wherein the on-board system further performs determining whether or not the rotation detector is abnormal, on the basis of whether or not the phase difference between the two pulse signals, related to the same rotation detector, is reversed.

6. The on-board system according to claim 4, wherein the on-board system further performs determining whether or not the rotation detector is abnormal, on the basis of whether or not the phase difference between the two pulse signals, related to the same rotation detector, is reversed.

7. The on-board system according to claim 1, wherein the on-board system further performs determining, on the basis of whether or not at least one of a speed and acceleration/deceleration based on the rotation detection signal satisfies a predetermined abnormality condition, whether or not the rotation detector that has output the rotation detection signal is abnormal.

8. The on-board system according to claim 2, wherein the on-board system further performs determining, on the basis of whether or not at least one of a speed and acceleration/deceleration based on the rotation detection signal satisfies a predetermined abnormality condition, whether or not the rotation detector that has output the rotation detection signal is abnormal.

9. The on-board system according to claim 1, wherein the on-board system further performs:
calculating speeds from each of the rotation detection signals for each of the rotation detectors, and
determining that, when a part of the calculated speeds each calculated for a corresponding one of the rotation detectors is zero for a predetermined maintained time and remaining of the calculated speeds is not zero, the rotation detector corresponding to the zero speed is abnormal or a signal line of the rotation detector is broken.

10. The on-board system according to claim 2, wherein the on-board system further performs:
calculating speeds from each of the rotation detection signals for each of the rotation detectors, and
determining that, when a part of the calculated speeds each calculated for a corresponding one of the rotation detectors is zero for a predetermined maintained time and remaining of the calculated speeds is not zero, the rotation detector corresponding to the zero speed is abnormal or a signal line of the rotation detector is broken.

11. A train occupancy range calculation method of calculating, by an on-board system mounted on a train, a train occupancy range in which the train may exist, the train being provided with rotation detectors that are each provided to a corresponding one of a plurality of axles of the train and each output a rotation detection signal corresponding to rotation of the axle, the method comprising:
calculating train positions of the train for each of the rotation detectors on the basis of the rotation detection signal from corresponding the rotation detector;
detecting an occurrence of slip-or-skid of a wheel for any one of the plurality of axles, by using the rotation detection signals from the rotation detectors;
setting, when the occurrence of the slip-or-skid is not detected, a no-slip-or-skid state range that is a train occupancy range including a range of a train length of the train based on any of train positions obtained for each of the rotation detectors, a range of a forward margin distance of the train, and a range of a backward margin distance of the train; and
setting, when the occurrence of the slip-or-skid is detected, the train occupancy range to be a range that includes a range of the train length based on a forward-most one of the train positions obtained for each of the rotation detectors, the range of the forward margin distance, and a range obtained by expanding the range of the backward margin distance backward by a distance equal to or larger than a difference between the train positions obtained for each of the rotation detectors, to be a range that includes the no-slip-or-skid state range and is wider than the no-slip-or-skid state range.

12. A train occupancy range calculation method of calculating, by an on-board system mounted on a train, a train occupancy range in which a train may exist, the train being provided with rotation detectors that are each provided to a corresponding one of a plurality of axles of the train and each output a rotation detection signal corresponding to rotation of the axle, the method comprising:
- calculating train positions of the train for each of the rotation detectors on the basis of the rotation detection signal from corresponding the rotation detector;
- detecting an occurrence of slip of a wheel and an occurrence of skid of a wheel for the plurality of axles, by using the rotation detection signals from the rotation detectors;
- setting, when the occurrence of any one of the slip and skid is not detected, no-slip-or-skid state range that is the train occupancy range including a range of a train length of the train based on any one of the train positions obtained for each of the rotation detectors, a range of a forward margin distance of the train, and a range of a backward margin distance of the train;
- setting, when the occurrence of the slip is detected, the train occupancy range to be a range including a range of the train length based on a backward-most one of the train positions obtained for each of the rotation detectors, a range obtained by expanding forward the range of the forward margin distance, and the range of the backward margin distance, to be a range that includes the no-slip-or-skid state range and is wider than the no-slip-or-skid state range; and
- setting, when the occurrence of the skid is detected, the train occupancy range to be a range including a range of the train length based on a forward-most one of the train positions obtained for each of the rotation detectors, the range of the forward margin distance, and a range obtained by expanding backward the range of the backward margin distance, to be a range that includes the no-slip-or-skid state range and is wider than the no-slip-or-skid state range.

* * * * *